United States Patent [19]
Miyazaki

[11] Patent Number: 5,377,925
[45] Date of Patent: Jan. 3, 1995

[54] FISHING REEL
[75] Inventor: Takeo Miyazaki, Tokyo, Japan
[73] Assignee: Daiwa Seiko, Inc., Tokyo, Japan
[21] Appl. No.: 148,532
[22] Filed: Nov. 8, 1993

Related U.S. Application Data
[63] Continuation of Ser. No. 803,557, Dec. 9, 1991, abandoned.

[30] Foreign Application Priority Data
Dec. 21, 1990 [JP] Japan .............. 2-404061[U]

[51] Int. Cl.⁶ .............................................. A01K 89/00
[52] U.S. Cl. .................................................. 242/312
[58] Field of Search ................................ 242/279, 310

[56] References Cited
U.S. PATENT DOCUMENTS

| | | | |
|---|---|---|---|
| 1,565,402 | 12/1925 | Schmid | 242/310 |
| 4,575,024 | 3/1986 | Kaneko | 242/310 |
| 4,666,101 | 5/1987 | Atobe | 242/310 |
| 4,750,684 | 6/1988 | Morimoto | 242/279 |
| 4,807,827 | 2/1989 | Welch | 242/279 |
| 4,821,978 | 4/1989 | Kaneko | 242/310 |
| 4,905,930 | 3/1990 | Puryear et al. | 242/315 |
| 5,108,042 | 4/1992 | Puryear et al. | 242/310 |

FOREIGN PATENT DOCUMENTS
60-22178 2/1985 Japan .
60-55369 4/1985 Japan .

OTHER PUBLICATIONS
Daiwa Corp, 1987 Product Catalog, 1986, pp. 18–21.

Primary Examiner—Daniel P. Stodola
Assistant Examiner—Eileen A. Dunn
Attorney, Agent, or Firm—Longacre & White

[57] ABSTRACT

A fishing reel in which a spool is rotatably supported by a main body includes a frame, a right side cover and a left side cover. The fishing reel is characterized in that an auxiliary cover for protecting the finger and thumb of the user of the reel from a flat winding mechanism, or/and an auxiliary cover for improving the manipulating property of the reel are provided on both side covers between them. In addition, one end portion of each of the auxiliary covers, which is located where the spool is inserted into and pulled out of the frame, is removably engaged with one side plate of the frame, so that the auxiliary cover is prevented from coming off the side plate. Further, the other end portion of each of the auxiliary covers is engaged with the side cover located outside the other side plate of the frame.

7 Claims, 5 Drawing Sheets

FISHING REEL

This is a continuation of application Ser. No. 07/803,557, filed Dec. 9, 1991, which was abandoned upon the filing hereof.

BACKGROUND OF THE INVENTION

The present invention relates to a fishing reel in which at least one auxiliary cover is supported on a right and a left side cover and extends between them.

A conventional fishing reel, which is of such a type that a spool shaft is supported at both the ends thereof, includes an auxiliary cover provided on a right and a left side and extending between them so as to receive and support the thumb of the hand of the user of the reel when the reel is held with the hand, or/and an auxiliary cover provided on and extending between the side covers so as to protect the finger or thumb of the user from a level wind mechanism.

An example of the former auxiliary cover of the conventional fishing reel is made of a finger rest plate removably and pivotally fitted on a bar by using the elasticity of the notched support portion of the plate, as described in the Japan Utility Model Application (OPI) No. 22178/85 (the term "OPI" as used herein means an "unexamined published application"). However, since the bar, which is supported on a right and a left side cover and extends between them, needs to be located where the finger rest plate is disposed, the number of the components of the reel is increased and the efficiency of the assembly thereof is lowered. This is a problem. Besides, since the notched support portion of the finger rest plate deformable to open and close at the notch thereof, the support portion is so low in strength as to be likely to undergo a crack to come off the bar. This is also a problem.

An example of the latter auxiliary cover of the conventional fishing reel is a cover having a finger rest portion and located near a level wind mechanism, as described in the Japan Utility Model Application (OPI) No. 55369/85. However, since a plurality of bars, with which the bent portion of the cover is engaged, and a plurality of screws for securing the cover, need to be provided, the number of the components of the reel and the number of the steps of the assembly thereof are increased and the efficiency of the assembly is lowered. This is a problem.

SUMMARY OF THE INVENTION

The present invention was made in order to solve the above-mentioned problems. Accordingly, it is an object of the invention to provide fishing reel in which the number of components is diminished to reduce the number of the steps of assembly of auxiliary covers, and the auxiliary covers are prevented from separating from the main body of the reel when a spool is removed for replacement or the like.

In the fishing reel, the spool is rotatably supported by the main body including a frame, a right side cover and a left side cover. The reel is characterized in that the auxiliary covers are provided on and extend between both the side covers so that one of the auxiliary cover serves to protect the finger or thumb of the user of the reel from a level wind mechanism, and the other of the auxiliary covers serves to improve the manipulating property of the reel; one end portion of each the auxiliary covers, which is located where the spool is inserted into and pulled out of the frame, is removably engaged with one side a left of the frame so that the auxiliary cover is prevented from coming off the side plate; and the other end portion of each of the auxiliary covers is engaged with the side cover located outside the other side plate of the frame.

When the auxiliary covers are supported by both the side covers, the end portions of the auxiliary covers, which are located where the spool is inserted into and pulled out of the frame, are removably engaged with one side plate of the frame so as to be prevented from coming off the side plate in the transverse and circumferential directions of the frame, and the other end portions of the auxiliary covers are engaged with the side cover located outside the other side plate of the frame. For that reason, the number of the components of the reel is diminished to enhance the assembling property of the reel, and the auxiliary covers are prevented from separating from the main body of the reel when the spool is removed for replacement or the like.

DESCRIPTION OF THE DRAWINGS

FIG. 8 is an exploded plan view of the reel in the state that a spool is removed from the main body of the reel so as to undergo replacement or the like;

DETAILED DESCRIPTION OF EXEMPLARY EMBODIMENTS

Figure 1:
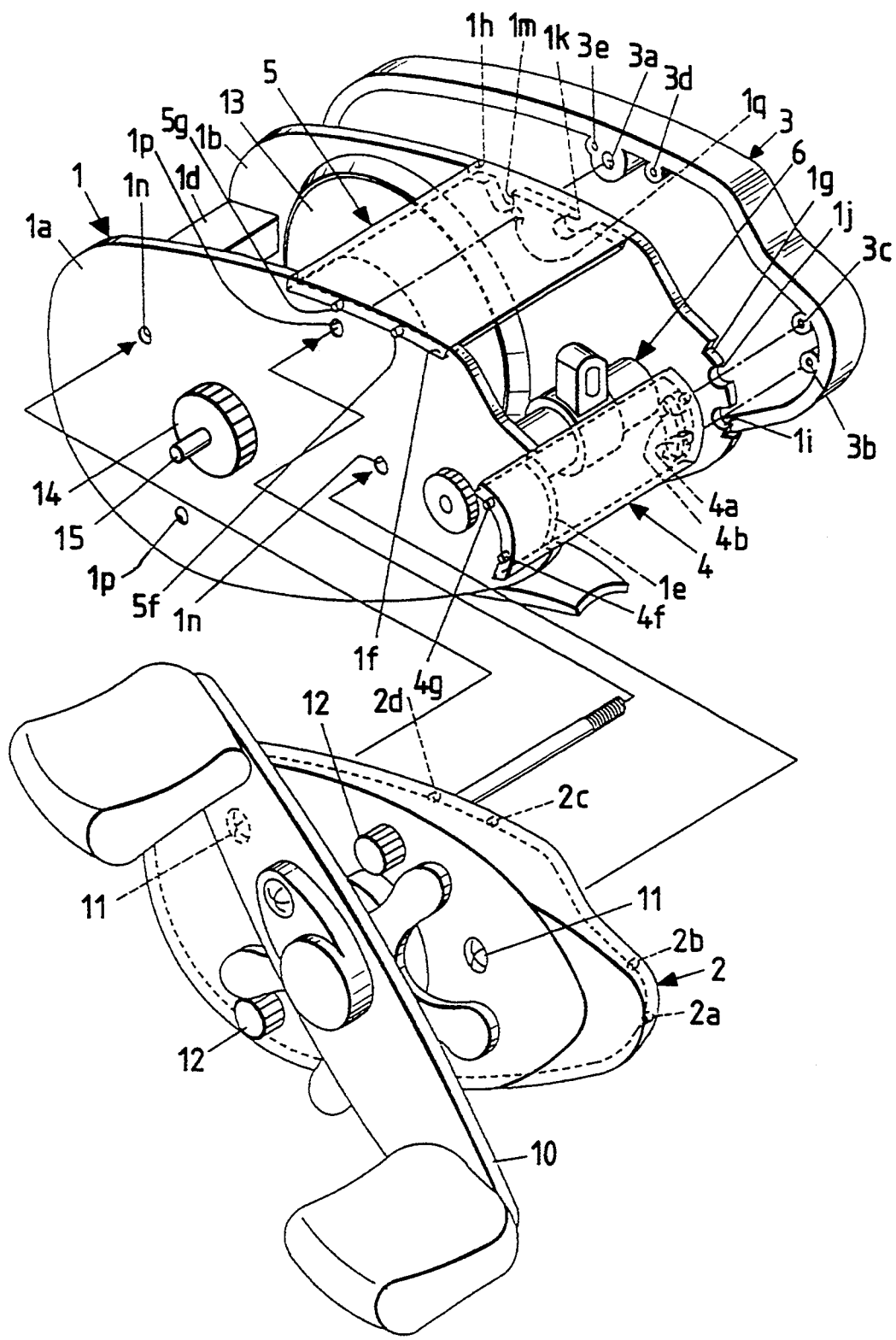
FIG. 1 is an exploded perspective view of a fishing reel which is an embodiment of the present invention.

Embodiments of the present invention are hereafter described in detail with reference to the drawings attached hereto.

FIGS. 1, 2, 3, 4, 5, 6, 7 and 8 show a fishing reel which is one of the embodiments and is of such a type that a spool shaft is supported at both the ends thereof. The fishing reel comprises a main body A, an auxiliary cover 4 for protecting the finger or thumb of the user of the reel, an auxiliary cover 5 for improving the manipulating property of the reel, a level winding mechanism 6, a handle 10, and a spool 13.

Figure 2:
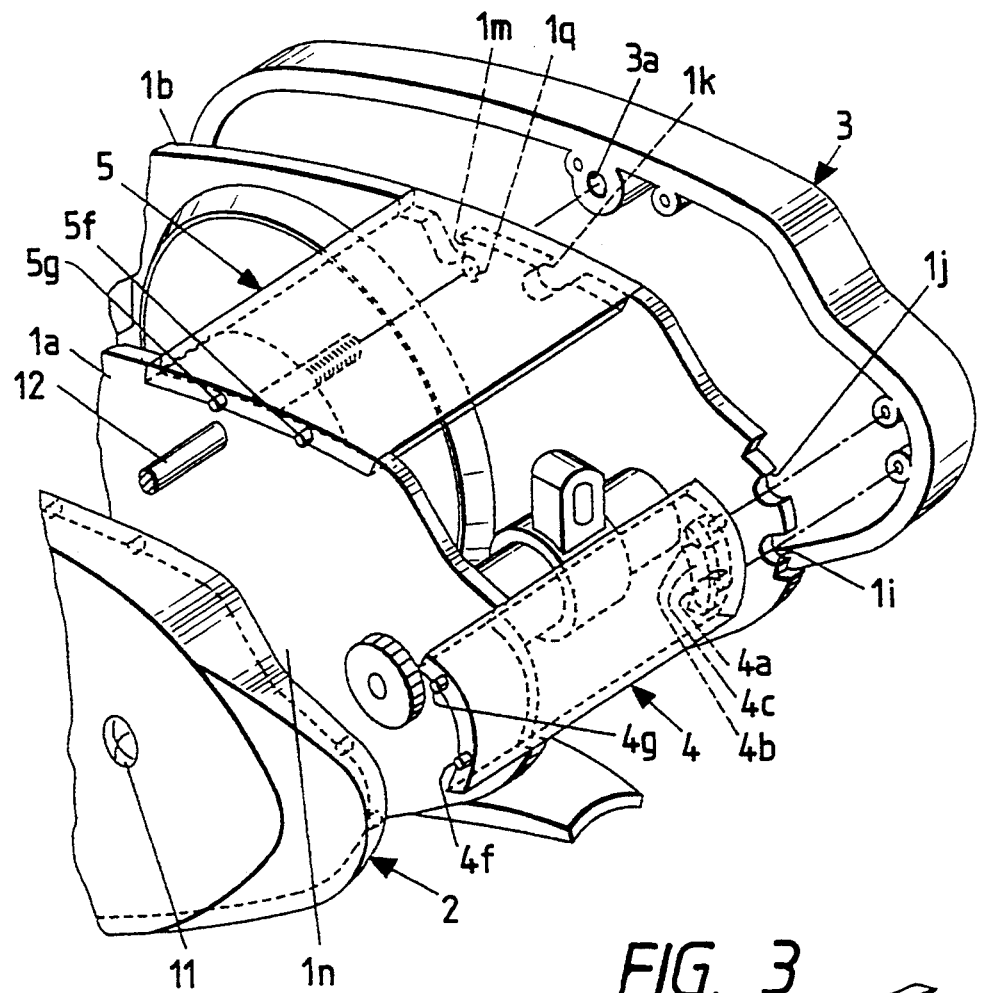
FIG. 2 is a perspective view of a major part of the reel.
Figure 3:
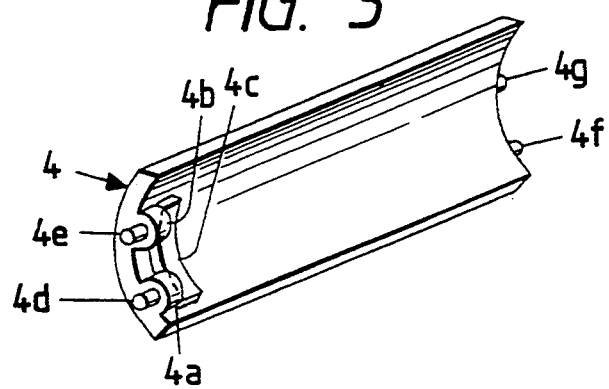
FIG. 3 is a perspective view of the protecting auxiliary cover of the reel.
Figure 4:
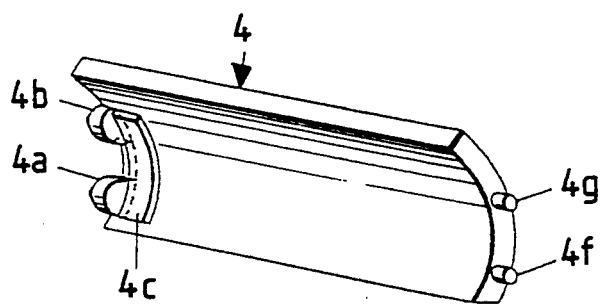
FIG. 4 is another perspective view of the cover.

The main body A includes a frame 1, a right side cover 2 and a left side cover 3. In assembling the fishing reel, the auxiliary covers 4 and 5 are secured to the fitting portions of the frame 1, the right side cover 2 fitted with the handle 10 is secured to the frame by screws 11, and the left side cover 3 is secured to the frame by screws 12 extending through the frame from the right side cover, as shown in FIGS. 1 and 2. To remove the spool 13 from the main body A after the assembly, the screws 12 are loosened and the left side cover 3 is then detached from the frame 1.

Figure 5:
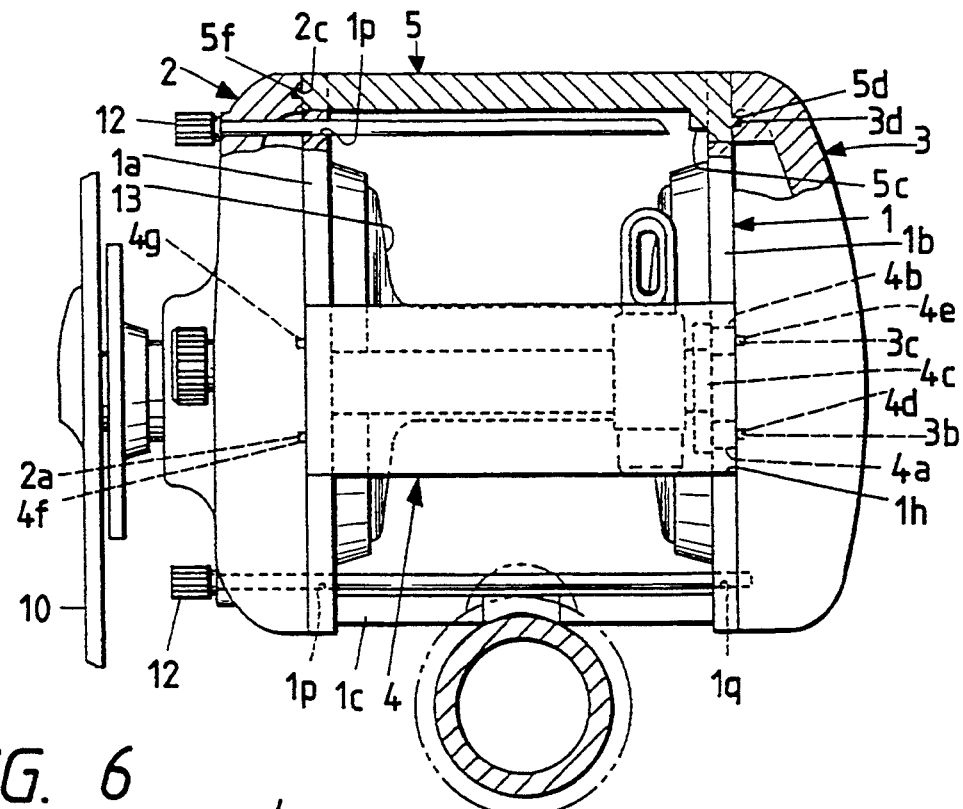
FIG. 5 is a cutaway front view of the reel.
Figure 6:
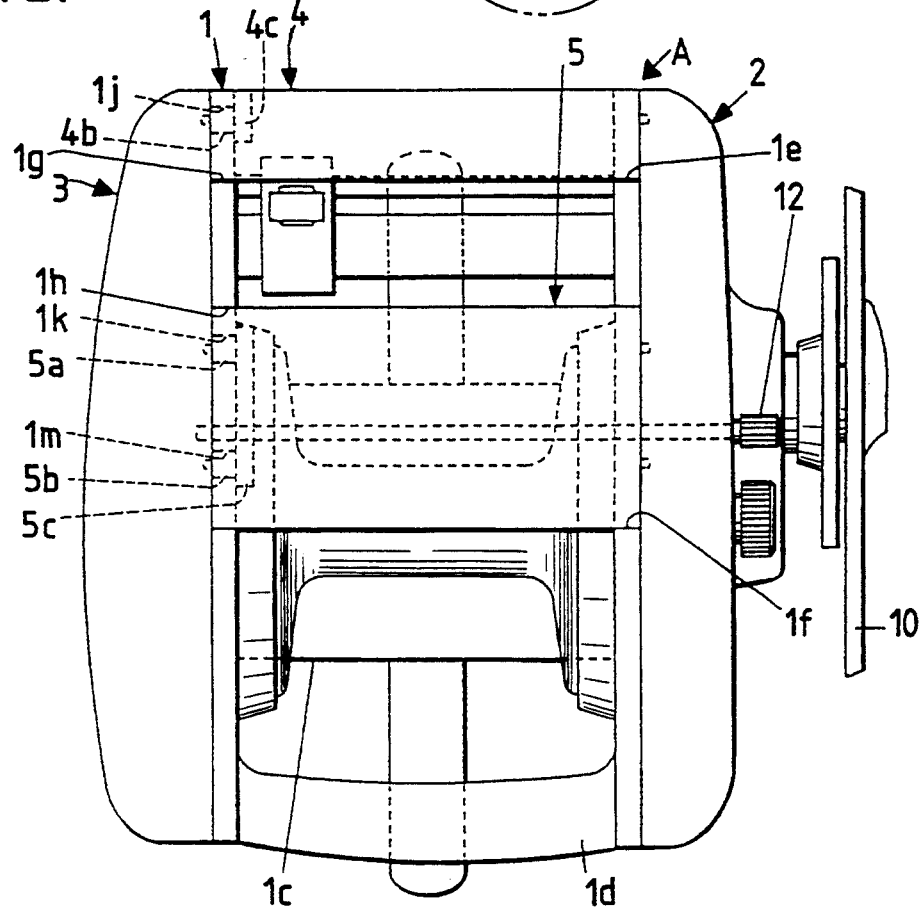
FIG. 6 is a plan view of the reel.

The frame 1 includes a right side plate 1a, a left side plate 1b, a reel foot securing plate 1c, and a finger rest 1d, as shown in FIGS. 1, 5 and 6. The side plates 1a and 1b are integrally conjoined to the reel foot securing plate 1c and the finger rest 1d so that the side plates extend in parallel with each other. The right and the left side covers 2 and 3 of the main body A are fastened to the outer surfaces of the side plates 1a and 1b. The flat winding mechanism 6 is provided between the side plates 1a and 1b at the front portions thereof. The right side plate is has openings 1e and 1f for the auxiliary covers 4 and 5, as shown in FIGS. 1. and 2. The length of the openings 1e and 1f are equal to the widths of the auxiliary covers 4 and 5, respectively. The left side plate 1b has openings 1g and 1h for the auxiliary covers 4 and 5. The lengths of the openings 1g and 1h are equal to the widths of the auxiliary covers 4 and 5, respectively. The left side plate 1b has notches 1i and 1j communicating with the opening 1g thereunder, and other notches 1k and 1m communicating with the other opening 1h thereunder. Each of the notches is shaped as an arc at the bottom of the notch, and open at the upside thereof.

A pinion 14 is provided on a clutch on the spool shaft 15 outside the right side plate 1a so that the pinion can be moved in the longitudinal direction of the spool shaft. A drive mechanism is made of a drive gear between the outer surface of the right side plate 1a and the inner surface of the right side cover 2 so that drive gear can be rotated by the handle 10. The right side plate 1a has tapped holes in in which the screws 11 are engaged to secure the right side cover 2 to the frame 1. The right and the left side plates 1a and 1b have through holes 1p and 1q through which the screws 12 are inserted to secure the left side cover 3 to the frame 1. The right side cover 2 have holes through which the screws 12 are inserted. The left side cover 3 has tapped holes 3a in which the screws 12 are engaged.

The auxiliary covers 4 and 5 have a pair of projections 4a and 4b and a pair of projections 5a and 5b, respectively, at one end of the auxiliary cover, as shown in FIGS. 1, 2, 3, 4, 5 and 7. The projections 4a and 4b and those 5a and 5b are fitted in the notches 1i and 1j and those 1k and 1m, respectively. The auxiliary covers 4 and 5 have contact juts 4c and 5c which abut the left side plate 1b so that the auxiliary covers are prevented from coming off the plate toward the left side cover 3. Pins 4d, 4e, 5d and 5e are provided on the outer surfaces of the projections 4a, 4b, 5a and 5b, and inserted into the holes 3b, 3c, 3d and 3e of the left side cover 3, respectively. Other pins 4f, 4g, 5f and 5g are provided on the auxiliary covers 4 and 5 at the other ends thereof, and inserted into the holes 2a, 2b, 2c and 2d of the right side cover 2, respectively.

Figure 7:
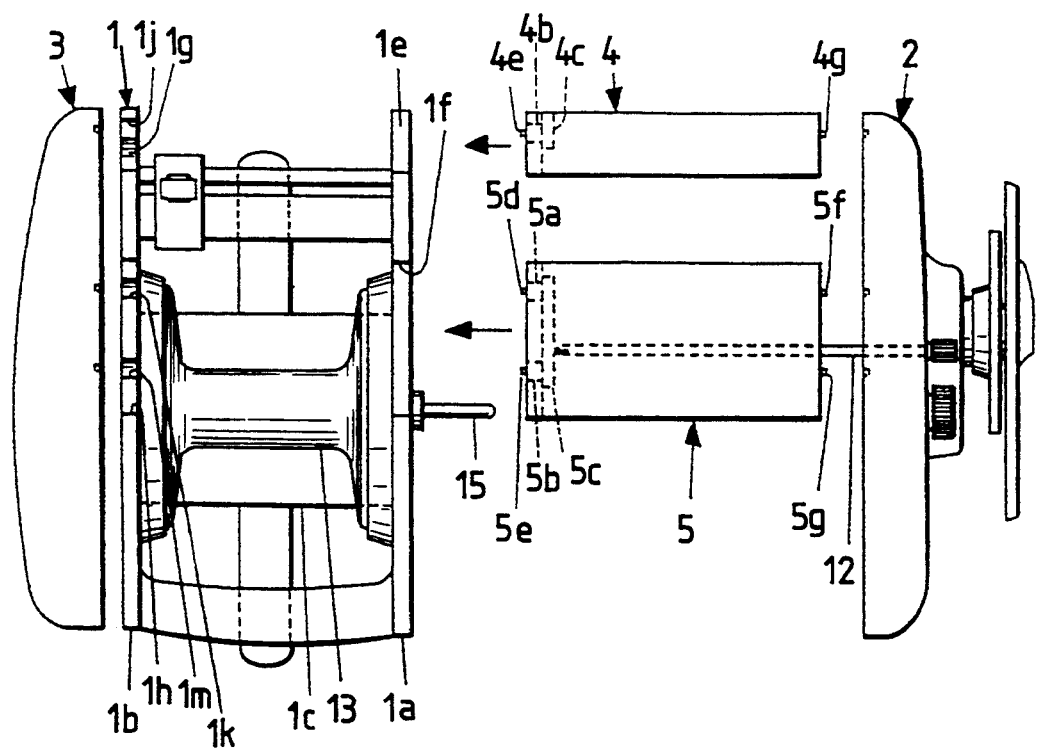
FIG. 7 is a exploded plan view of the reel in the state that the reel is being assembled.
Figure 8:
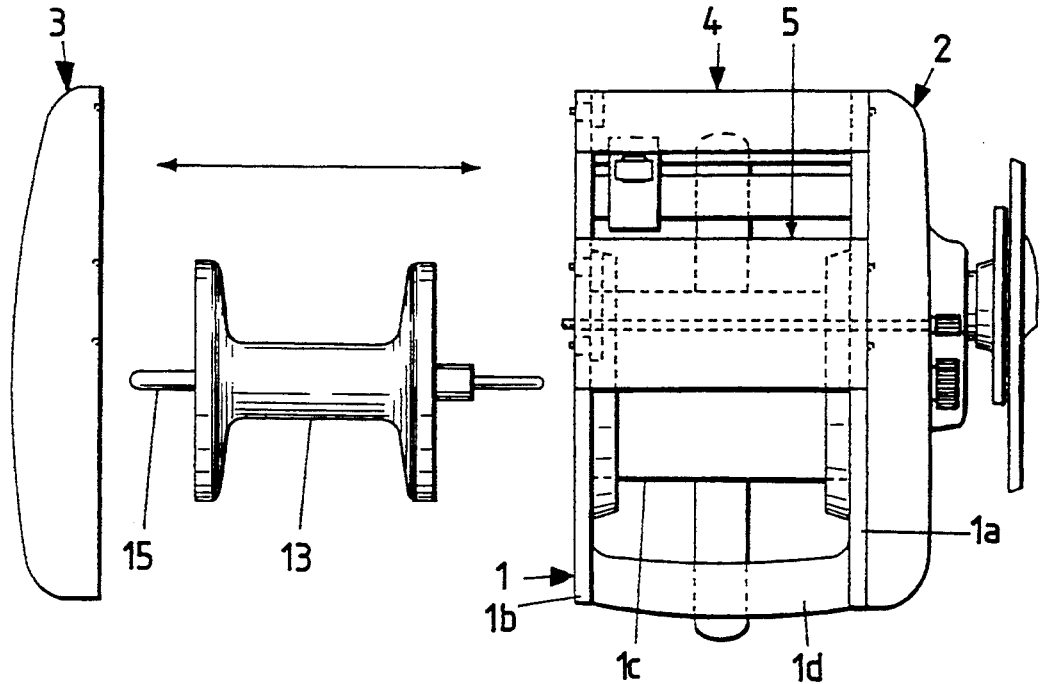

In assembling the fishing reel as shown in FIG. 7, the auxiliary covers 4 and 5 are inserted into the frame 1 rightward, the projections 4a, 4b, 5a and 5b of the auxiliary covers are fitted in the notches 1i, 1j, 1k and 1m of the left side plate 1b, the contact juts 4c and 5c of the auxiliary covers are located in contact with the plate to prevent the auxiliary covers from coming off, the right side cover 2 is fitted on the outer surface of the right side plate 1a and secured thereto by the screws 11, and the left side cover 3 is secured to the left side plate by the screws 12. To remove the spool 13 from the main body A of the reel to subject the spool to replacement or the like, the screws 12 are loosened and the left side cover 3 is then detached from the left side plate 1b, as shown in FIG. 8.

Since the auxiliary covers 4 and 5 are secured to the frame 1 and the side covers 2 and 3 without directly applying a screw to the auxiliary covers, the number of the components of the fishing reel and the number of the steps of the assembly thereof are diminished and the efficiency of the assembly is enhanced. Although the two screws 12 are loosened to remove the spool 13 from the main body A to subject the spool to replacement or the like, the projections 4a, 4b, 5a and 5b of the auxiliary covers 4 and 5 remain fitted in the notches 1i, 1j, 1k and 1m of the side plates 1a 1b to prevent the auxiliary covers from coming off in the circumferential direction of the frame 1, and the contact juts 4c and 5c of the auxiliary covers remain in contact with the left side plate 1b to prevent the auxiliary covers from coming off in the transverse direction of the frame. For that reason, the auxiliary covers 4 and 5 are unlikely to separate from the frame 1 and the right side cover 2 when the spool 13 is removed from the main body A.

Although the side plates 1a and 1b, reel foot securing plate 1c and finger rest 1d of the frame 1 are integrally formed, they may be separately formed and then conjoined together. The pins 4d, 4e, 5d and 5e and the holes 3b, 3c, 3d and 3e may not be provided. Although the left side cover 3 is detached from the frame 1 after the screws 12 are loosened to remove the spool 13 from the main body A, the finishing reel may be constructed to detach the right side cover 2 from the frame instead of the left side cover for the removal. If the reel is thus constructed, the right side plate 1a is provided with the notches 1j, 1j, 1k and 1m, and the projections 4a, 4b, 5a and 5b and the contact juts 4c and 5c are provided on the auxiliary covers 4 and 5 art the opposite ends thereof. Although the drive mechanism made of the drive gear is provided between the outer surface of the right side plate 1a and the inner surface of the right side cover 2, another side plate may be provided on the right side cover to dispose the drive mechanism between them.

Figure 9:
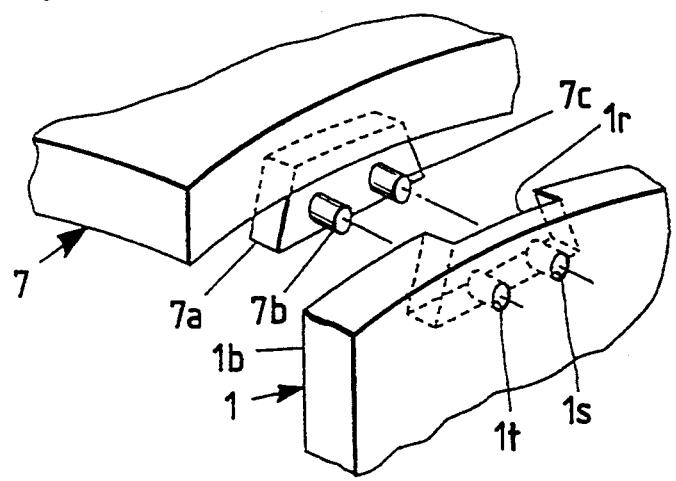
FIG. 9 is an exploded perspective view of a major part of a fishing reel which is another embodiment of the present invention.
Figure 10:
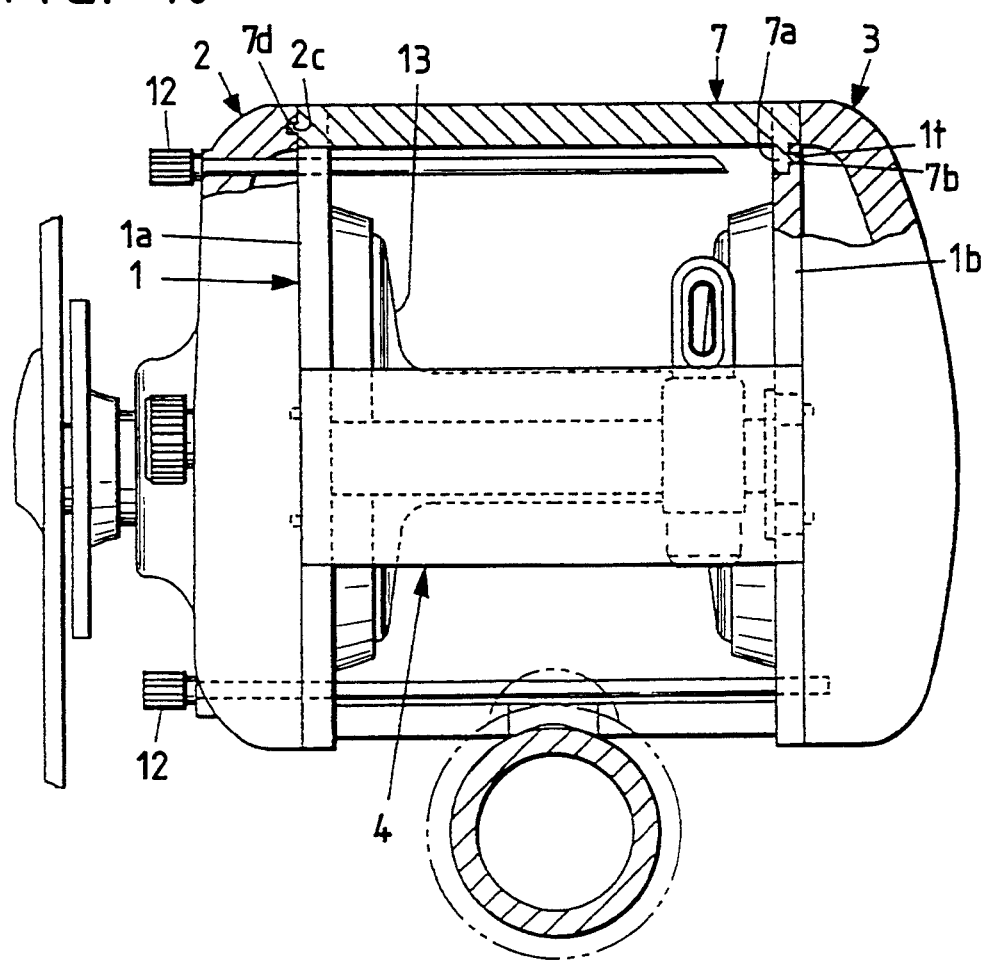
FIG. 10 is a cutaway front view of the reel shown in FIG. 9.

FIGS. 9 and 10 show a fishing reel which is another of the embodiments and is of the same type as the preceding fishing reel. The difference of the reel from the preceding one is that the reel shown in FIGS. 9 and 10 includes a left side plate 1b having a recess 1r whose front and rear surfaces extend convergently upward, and holes 1t and 1s, and an auxiliary cover 7 which is for improving the manipulating property of the reel and has a contact jut 7a which is located at one end of the auxiliary cover and whose front and rear surfaces extend convergently upward, pins 7b and 7c at that end, and another pin 7d located at the other end of the cover and fitted in the hole 2c of a right side cover 2. The front and rear surfaces of the contact jut 7a may extend vertically in parallel with each other. The auxiliary cover 7 is fixedly fitted in between the right and left side plates of the frame of the reel and the pins 7b and 7c are fitted in the holes 1t and 1s so that the auxiliary cover is prevented from coming off in the circumferential and transverse directions of the frame. The recess 1r may not be provided.

The present invention is not confined to the above-described embodiments and modifications but may be embodied or practiced in other various ways without departing from the scope and spirit of the invention. For example, the fishing reels may be of other types.

What is claimed is:

1. A fishing reel in which a spool is supported by a frame for rotation about an axis, said fishing reel comprising:

said frame including a first side plate provided at a first axial end of said spool, said spool being adapted to be inserted into and pulled out of said frame through said first side plate, and a second side plate provided at a second axial end of said spool;

a first side cover provided on an outer surface of said first side plate;

a second side cover provided on an outer surface of said second side plate; and at least one auxiliary cover member abutting with and extending between said first and second side covers, said auxiliary cover member having first projection means for preventing transverse movement with respect to said axis and allowing longitudinal movement parallel to said axis, said first side plate having notch means for cooperatively engaging said first projection means, and said second side cover having means for restricting said transverse movement, wherein said auxiliary cover member is removably engaged with said first side plate, and adapted to be removed from said first side plate upon removal of said second side cover, and second projection means preventing said longitudinal movement in the direction of said first side plate upon removal of said first side.

2. A fishing reel according to claim 1, wherein a level wind mechanism is provided in said frame, and said auxiliary cover member comprises:

a first auxiliary cover adapted to protect the finger or thumb of the user of the reel from said level wind mechanism.

3. A fishing reel according to claim 2, further comprising:

a second auxiliary cover adapted to receive and support the thumb of the user of the reel when the reel is held with the hand.

4. A fishing reel according to claim 1, wherein said at least one auxiliary cover member comprises:

a plurality of auxiliary cover members, one of said plurality of auxiliary cover members is adapted to receive and support the thumb of the user of the reel when the reel is held with the hand.

5. A fishing reel according to claim 1, wherein said second projection means includes:

a contact jut adapted to abut said first side plate, said contact jut restricts said longitudinal movement toward said first side cover.

6. A fishing reel according to claim 5, wherein said auxiliary cover member further includes:

at least one pin member provided on an outer surface of said projection for being engaged with said first side plate.

7. A fishing reel according to claim 1, wherein said second projection means includes:

a contact jut adapted to abut said first side plate; and
at least one pin member provided on an outer surface of said contact jut engaging said first side plate.

* * * * *